Patented Feb. 21, 1950

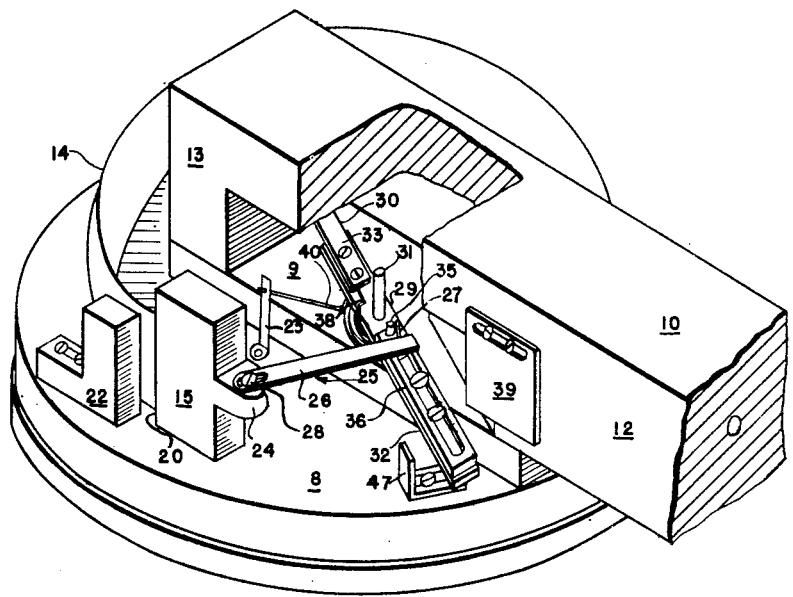
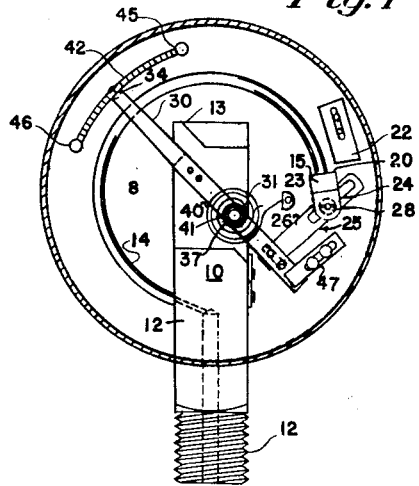
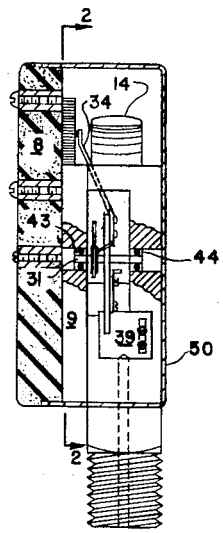
INVENTOR.
*Marlan E. Bourns*

2,497,974

UNITED STATES PATENT OFFICE 2,497,974

PRESSURE RESPONSIVE RHEOSTAT

Marlan E. Bourns, Altadena, Calif.

Application September 27, 1949, Serial No. 118,015

3 Claims. (Cl. 201—48)

This invention relates to a pressure responsive resistance and, more particularly, to a pressure responsive potentiometer capable of precision telemetering operation on air-borne vehicles.

The operations involved in communicating between stations on aircraft and between guided missiles and ground stations includes the process of translating pressure variations into variations of a transmittable form of energy. An important step in this process is the translation of mechanical motion of a pressure responsive chamber into proportional variations of an electrical quantity.

The present invention is directed to a novel arrangement for accurately translating variations in configuration of a Bourdon tube into variations of electrical resistance.

The broad combination of Bourdon tube and potentiometer is taught in the prior art. For example, the patent to Mather, No. 2,226,629, shows a rheostat slider fixed to the movable end of a Bourdon tube. The specific combination of the present invention contains a number of improvements which enable the attainment of accurate performance under widely variable conditions. For example, in order to obtain a linear variation in resistance with a linear change in pressure, the Bourdon tube must be constrained to limits of distortion well within the elastic capabilities of the tube. This consideration requires that the motion of the Bourdon tube be translated to amplified motion of the movable resistance element. Such linkage as used between the Bourdon tube and resistance for the attainment of amplified motion must have an extremely low level of friction in the absence of lubricant. Lubricant cannot be utilized in equipment subject to low temperatures because increases in viscosity cause sluggish effects.

It is, therefore, the objective of this invention to provide a compact, rugged and accurate Bourdon tube actuated potentiometer.

Another objective is the provision of a novel linkage between a Bourdon tube and a movable electrical contact which is capable of uniform operation throughout wide variations in temperature, and which provides in combination with a strip resistance, resistance changes proportionate to pressure changes.

Another object of the present invention resides in the provision of a combined potentiometer and pressure responsive device of a unitary nature and including features of adjustability such as to enable its use in fluid systems of various pressures and convenient insertion in an electrical circuit including an indicator.

With the above objectives in view and other objectives which will presently become apparent, the invention consists in the combination of a Bourdon tube and potentiometer in an appropriate housing shown by the preferred embodiment illustrated in the accompanying drawing in which:

Figure 1 is an isometric view of the mechanism taken from the rear.

Figure 2 is a rear view taken on plane 2—2 of Figure 3.

Figure 3 is a vertical side view of the device.

Referring to Figures 1 and 2 of the drawing, the device is provided with a base member 8 which serves as a mounting base and one wall of an enclosure for the device. Secured to the base substantially on a median line thereof is a bearing plate 9. A stem member 10 is affixed in superposed position on the base plate and extends outwardly from the base on the coupling end 12 and is foreshortened on the other end 13. The stem is reduced in cross-section for a distance proximate the end 13 so as to provide a channel clearance facing the bearing plate.

The Bourdon tube 14 is fixedly supported at one end to the stem 12 by a fluid-tight joint in such manner that its motion, due to pressure variations, lies in a plane substantially parallel to the base. The free end of the Bourdon tube is capped by a tip element 15. The tip element is provided with shoulder 20 for cooperation with an adjustable stop member 22 in order to prevent distortion of the Bourdon tube due to overpressures. The tip member also includes an elongated extension portion 24 having an aperture therethrough normal to the base 8. A link 25 of equivalent L shape, having a long arm 26 and a short arm 27 normal thereto, is fixedly secured to the tip member extension portion in adjustably selected position by fastening member 28. The link is not necessarily limited to physical L shape for the obvious reason that the arm 26 may be resilient and serpentine for shock absorbing purposes, but its equivalent shape remains generally that of an L.

A movable electrical contact arm or slider 30 is supported on one end of a dielectric pivoted arm 29. The arm 29 is affixed to pivot 31. Pivot 31 is rotatably supported in bearings 43 and 44 in plate 9 and stem 10, at a point slightly inward on a line normal to and passing through approximately the middle of a line connecting the ends of the Burdon tube. The slider element comprises a contactor end 34 for engaging a resistance strip 42, An actuator plate 36 is adjustably supported on the second end of the pivoted arm 29. An actuation pin 35 is fixed to plate 36. The plate 36 is adjustably attached to pivoted arm 29 so that actuation pin 35 can be spaced from the pivotable support by a radius so related to the length of the contactor end that the angular motion of the actuation pin, due to the motion of the free end of the Bourdon tube, is accompanied by the desired amplitude of angular movement of the contactor.

It follows from the foregoing description that the motion of the free end of the Bourdon tube is relayed to the slider element by co-action with the short arm 27 of link 25. The co-action is obtained by sliding contact between short arm 27 and actuation pin 35. The actuation pin is maintained in contact with the short arm 27 by means of hair spring 40. Spring 40 establishes electrical continuity between the slider element and fixed terminal post 23.

To the end that the slider assembly comprising pivoted arm 29, contact arm 30 and actuator plate 36 is provided with a retentive uniform torque throughout its angular motion, the hair spring 40 is mounted between a ferrule 37 insulatingly fixed to the pivot 31 and a fixedly mounted terminal post 23. Electrical continuity between the contact arm 30 and terminal post 23 is completed by a jumper conductor 38 between contact arm 30 and ferrule 37. In order to have the contact arm electrically isolated from the stem, the ferrule 37 is forced on a dielectric washer 41 which, in turn, is fixedly secured to the pivot 31.

A resistance strip 42 is affixed by terminal posts 45 and 46 to the base 8 in a position coinciding with the loci of positions of the slider element contact. The slider element arm 30 is of thin resilient material so that a light pressure is maintained between the slider element contact and the resistance strip.

In certain applications, it is desired that a fixed residual resistance remain in the circuit. In other cases, a shorter or longer resistance strip 42 may be provided. To the end that the initial position of the contact arm 30 can be selected, stop plate 39 is adjustably attached to the side of stem 10. A second adjustable stop plate 47 limits the maximum angular motion of arm 30.

It follows from the foregoing that a compact unitary pressure responsive potentiometer is provided having such features of adjustability that it is applicable to systems of widely different pressures, and electrical systems requiring widely different variations in electrical resistance.

The entire mechanism is compact by virtue of the coincident arrangement of Bourdon tube and rheostat actuating mechanism. A protective enclosure 50 houses the device to afford protection against physical injury and a seal against dirt and moisture.

Although the invention is shown by a preferred embodiment illustrated in the drawing and explained in this specification, variations without departing from the invention may be possible. It is understood, therefore, that the invention is limited only by the claims as interpreted in view of the prior art.

What is claimed is:

1. In a device of the class described, the combination of a Bourdon tube and a potentiometer of the radial slider type, a link member having a long arm and a short arm normal to the general direction thereof, means for adjustably affixing the free end of the link member long arm to the free end of the Bourdon tube with the short arm in a direction substantially corresponding to the perpendicular to the direction of motion of the free end of the Bourdon tube in its center of travel under the influence of pressure variations, an actuator pin affixed to the potentiometer radial slider and adapted to be engaged by the link member short arm, a spring retention member engaging the potentiometer radial slider and exerting a torque thereon to maintain the actuator pin and link short arm in sliding contact, whereby said Bourdon tube angularly moves said potentiometer radial slider due to a change in pressure and said spring retention means restores the position of the potentiometer radial slider due to an opposite change in pressure.

2. In a pressure responsive potentiometer, a bearing plate and a stem member, the stem member being attached to the base plate and having end portions and a reduced intermediate portion, whereby a space is provided between the intermediate stem portion and the bearing plate, a Bourdon tube affixed to the stem and adapted to move under the influence of pressure variations in a plane parallel to the plane of the bearing plate, a tip member affixed to the free end of the Bourdon tube, a link member adjustably affixed to the tip member; a potentiometer radial slider element having a contactor end and an actuator end pivotally supported in the space provided between the intermediate stem portion and the bearing plate, an actuator pin affixed to said potentiometer radial element at a selected distance from the pivotal support on the actuator end, said link member slidably engaging said actuator pin element whereby pressure changes in the Bourdon tube causes angular movement of the resistance movable element, and resilient means engaging the resistance movable element to establish a retentive torque thereon.

3. A pressure responsive potentiometer comprising a circular dielectric base member, a bearing plate affixed thereto, an elongated stem member having a generally rectangular cross-section portion and a nipple portion, said stem member having a rectangularly cross-sectional relief facing the bearing plate to provide a space therebetween, a Bourdon tube affixed to the stem member rectangular portion and having a free end, a tip member closing the Bourdon tube free end and having a shoulder portion and an end tongue portion, a stop member adjustably supported on the base member to abut the Bourdon tube tip member shoulder portion to thereby limit the outward movement of the Bourdon tube free end, a link member having substantially an L shape, means adjustably attaching the free end of the long arm of the link member to the Bourdon end tongue portion in such position that the short arm extends in the direction substantially normal to the motion of the Bourdon tube free end due to the pressure variations; a dielectric radial arm pivotally supported in said space in opposed portions of the stem member and bearing plate, a resistance strip supported substantially circumferentially about the radial arm pivotal support, a radially adjustable plate attached to the radial arm and having an actuator pin adapted to engage the link member short arm on an edge forming the included angle with the long arm, and a contactor arm supported on the other end of the radial arm and adapted to engage said resistance strip; said actuator pin being spaced from the pivot by a radius length which bears a ratio to the length of the contactor portion equal substantially to the ratio of Bourdon tube free end movement and the length of the arcuate resistance strip; a hair spring retention means having a first end engaging the radial arm pivot and a second end engaging a bracket affixed to the base member, an electrical connection between the contact arm and the hair spring first end, potentiometer radial arm opposed to that of the Bourdon tube torque and additionally establishes electrical continuity between the contact arm and the bracket.

MARLAN E. BOURNS.

REFERENCES CITED

The following references are of record in the file of this patent:

UNITED STATES PATENTS

| Number | Name | Date |
|---|---|---|
| 2,152,262 | Klein et al. | Mar. 28, 1939 |
| 2,226,629 | Mather | Dec. 31, 1940 |